J. F. TRITLE.
SELECTIVE A. C.- D. C. SYSTEM.
APPLICATION FILED JAN. 18, 1908.
935,070.
Patented Sept. 28, 1909.
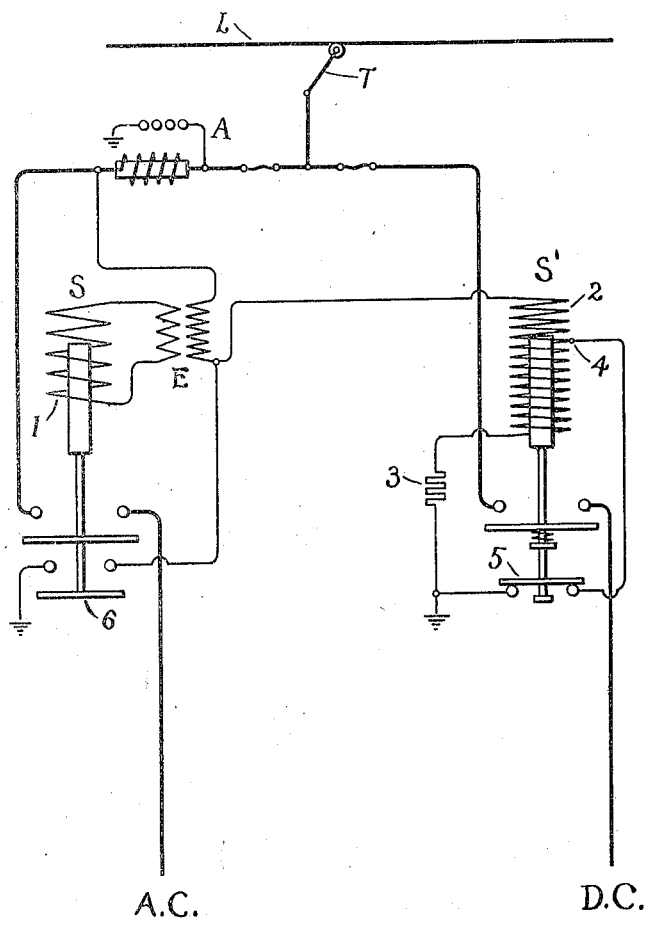
A.C.
D.C.
Witnesses
J. Ellis Glen
J. Earl Ryan
Inventor.
John F. Tritle
by [signature]
Atty.

UNITED STATES PATENT OFFICE

JOHN F. TRITLE, OF SCHENECTADY, NEW YORK, ASSIGNOR TO GENERAL ELECTRIC COMPANY, A CORPORATION OF NEW YORK.

SELECTIVE A.C.-D.C. SYSTEM.

935,070. Specification of Letters Patent. Patented Sept. 28, 1909.

Application filed January 18, 1908. Serial No. 411,453.

*To all whom it may concern:*

Be it known that I, JOHN F. TRITLE, a citizen of the United States, residing at Schenectady, county of Schenectady, State of New York, have invented certain new and useful Improvements in Selective A.C.-D.C. Systems, of which the following is a specification.

In electrically driven cars intended for operation either on alternating or direct current, usually high potential alternating current and low potential direct current, the change from one to the other being ordinarily made while the car is moving, it is customary to provide a system of selective switches arranged to automatically connect the current collecting device to the proper circuits of the car for either alternating or direct current operation. Such a system of selective switches is shown in the patent to Frank and Pevear, No. 854,730, dated May 28, 1907, Control of electric cars. The arrangement there shown consists of a small step-down transformer having its primary connected to the power circuit, the actuating coil of the A.C. switch being connected across the secondary of said transformer, and the actuating coil of the D.C. switch being in series with the primary of said transformer. With this arrangement the A.C. switch is operated only when the current collecting device is receiving alternating current, and the D.C. switch is supposed to operate only when the current collecting device connects with a source of direct current.

It is found in actual practice that a system such as that mentioned above is open to the objection that when the car enters an alternating current section the first rush of current, before the counter E. M. F. of the transformer has had time to build up may operate the D.C. switch. Such an occurrence is, of course, highly objectionable, and it is an object of my invention to provide means for absolutely and certainly preventing the D.C. switch from operating when the car enters, or while it is on an alternating current section.

In order to overcome the above mentioned objection, my invention consists in providing, in a system of the kind above mentioned, a contact on the D.C. switch arranged to short-circuit a portion of the actuating coil of said switch when said switch is in its open position. The effect of this short-circuiting of a portion of the actuating coil of the D.C. switch is to cause this coil to operate as a transformer with its secondary short-circuited, the result of which, if the division of the coil is properly made, is to reduce the magnetic flux threading the coil to practically zero. The D.C. switch is thus prevented from operating on alternating current.

My invention further contemplates the use of a contact closed by the closing of the A.C. switch for completing a shunt circuit from the primary of the transformer to ground around the actuating coil of the D.C. switch.

My invention will best be understood from the following description taken in connection with the accompanying drawing, in which I have shown diagrammatically one form in which it may be embodied.

I deem it unnecessary to illustrate any system of motor control, as it is obvious that my invention is not limited in its application to any particular control system. It may, however, be stated that, as illustrated, my selective A.C.-D.C. system is applicable to the system of motor control described in a patent issued in the name of George H. Hill, No. 904,780, dated November 24, 1908.

Referring to the drawing, L represents the trolley wire or other supply conductor with which the trolley T or other current collecting device carried by the car engages. It is to be assumed that the supply conductor is at some places supplied with alternating, and, at other places with direct current, the potential of the alternating current section being usually high, for example, 6600 volts, and the potential of the direct current section being relatively low, for example, 600 volts.

The usual kicking coil and lightning arrester are indicated in a well known conventional manner at A.

The main switch which is intended to close only on alternating current operation is indicated at S, and the main switch which closes only on direct current operation is shown at S¹. These switches S and S¹ may be of any suitable design.

A small step-down transformer, represented at E, is shown with its primary connected between trolley and ground. The actuating coil 1 of the A.C. switch S is connected across the secondary of the transformer E, and the actuating coil 2 of the D.C. switch S¹ is connected in series with the primary of the transformer E. This coil 2 is connected permanently to ground through the non-inductive resistance 3. An intermediate point, such as 4, on the coil 2 is also connected to ground through a contact 5, closed when the switch S¹ is in its open position but opened when said switch closes. A contact 6, closed by the A.C. switch S in closing, connects the primary of the transformer E directly to ground, thereby shunting the coil 2 of the switch S¹.

The operation of my selective system is as follows,—Suppose the switches S and S¹ in their open position, as illustrated in the drawing: If the current collecting device engages with a supply conductor furnishing alternating current at high potential, current will flow from the line, through the primary of the transformer E, the upper part of the coil 2 to the point 4, and thence to ground through the contact 5. The first rush of current which occurs before the counter E. M. F. of the transformer E has had time to build up, might be sufficient to close the D.C. switch S¹ were it not for the fact that the lower part of the coil 2 being short-circuited causes the coil 2 to act as a transformer having its secondary short circuited, and therefore the magnetic flux passing through it to be practically zero. The switch S¹ will, therefore, not close on alternating current. The A.C. switch will, however, be closed by the energization of its coil 1 from the secondary of the transformer E. The switch S in closing closes the contact 6 and shunts the actuating coil 2 of the switch S¹. If the current collecting device T engages a supply conductor furnishing direct current, current will flow through the primary of the transformer E and the upper part of the coil 2 of the switch S¹ through the contact 5 to ground. The magnetization produced by the upper part of the coil 2 will be sufficient to close the switch S¹, which in closing opens the contact 5 and forces the current to flow through the whole of the coil 2 and the resistance 3 to ground. The switch S¹ is, therefore, held closed by current which passes through the whole of the coil 2, which current is reduced to a safe value to avoid heating by the resistance 3. The switch S, of course, will be unaffected by direct current.

It is not my intention to limit myself to the particular arrangement of devices shown. I aim to cover in the following claims all modifications which are within the scope of my invention.

What I claim as new, and desire to secure by Letters Patent of the United States, is,—

1. A selective A.C.-D.C. system for electric cars comprising energy transforming means the primary of which is connected to the power circuit, an A.C. switch, an actuating coil therefor connected to the secondary of said transforming means, a D.C. switch, an actuating coil therefor connected to the power circuit through the primary of said transforming means, and contacts controlled by said D.C. switch arranged to short circuit a portion of the actuating coil of said switch when said switch is in its open position.

2. A selective A.C.-D.C. system for electric cars comprising energy transforming means the primary of which is connected to the power circuit, an A.C. switch, an actuating coil therefor connected to the secondary of said transforming means, a D.C. switch, an actuating coil therefor connected to the power circuit through the primary of said transforming means, and contacts closed by said A.C. switch in closing for completing a shunt circuit around the actuating coil of the D.C. switch.

3. A selective A.C.-D.C. system for electric cars comprising a transformer having its primary connected to the power circuit, an A.C. switch, an actuating coil therefor connected across the secondary of said transformer, a D.C. switch, an actuating coil therefor in series with the primary of said transformer, and contacts controlled by said D.C. switch arranged to short-circuit a portion of the actuating coil of said switch when said switch is in its open position.

4. A selective A.C.-D.C. system for electric cars comprising a transformer having its primary connected to the power circuit, an A.C. switch, an actuating coil therefor connected across the secondary of said transformer, a D.C. switch, an actuating coil therefor in series with the primary of said transformer, and contacts closed by said A.C. switch in closing for completing a shunt circuit from the primary of said transformer around the actuating coil of the D.C. switch.

5. A selective A.C.-D.C. system for electric cars comprising a transformer having its primary connected to the power circuit, an A.C. switch, an actuating coil therefor connected across the secondary of said transformer, a D.C. switch, an actuating coil therefor in series with the primary of said transformer, contacts controlled by said D.C. switch arranged to short circuit a portion of the actuating coil of said switch when said switch is in its open position, and contacts controlled by said A.C. switch arranged when the A.C. switch closes to complete a shunt circuit from the primary of said transformer around the actuating coil of the D.C. switch.

In witness whereof, I have hereunto set my hand this 16th day of January, 1908.

JOHN F. TRITLE.

Witnesses:
BENJAMIN B. HULL,
HELEN ORFORD.